United States Patent
Geckler

(10) Patent No.: US 9,982,612 B2
(45) Date of Patent: May 29, 2018

(54) SYSTEMS AND METHODS FOR AFTERTREATMENT REGENERATION WITH DEDICATED EGR

(71) Applicant: Cummins, Inc., Columbus, IN (US)

(72) Inventor: Samuel C. Geckler, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 75 days.

(21) Appl. No.: 14/804,731

(22) Filed: Jul. 21, 2015

(65) Prior Publication Data

US 2016/0047326 A1 Feb. 18, 2016

(30) Foreign Application Priority Data

Aug. 12, 2014 (GB) .................................. 1414289.7

(51) Int. Cl.
*F02B 37/00* (2006.01)
*F02B 37/18* (2006.01)
(Continued)

(52) U.S. Cl.
CPC ....... *F02D 41/0275* (2013.01); *F01N 3/0814* (2013.01); *F01N 3/0885* (2013.01);
(Continued)

(58) Field of Classification Search
CPC ........ F01N 3/0814; F01N 3/0885; F01N 5/04; F01N 2260/04; F01N 2430/02;
(Continued)

(56) References Cited

U.S. PATENT DOCUMENTS 6,321,157 B1 11/2001 Sun et al.
7,945,376 B2 5/2011 Geyer et al.
(Continued)

FOREIGN PATENT DOCUMENTS

EP 2295769 A1 * 3/2011 ............. F02B 37/02
EP 2 604 842 6/2013
(Continued)

OTHER PUBLICATIONS

The UK Search Report issued in GB application No. 1414289.7, dated Feb. 11, 2016.

*Primary Examiner* — Audrey K Bradley
(74) *Attorney, Agent, or Firm* — Foley & Lardner LLP

(57) ABSTRACT

Systems and methods for implementing regeneration of an aftertreatment component using exhaust gas recirculation is described. According to various embodiments, an engine system comprises an engine, a turbocharger, a fluid control valve, and a lean $NO_x$ catalyst. The engine has a first set cylinders fluidly coupled to an intake manifold and a second set of cylinders having fluidly isolated from the intake manifold of the engine. The fluid control valve is disposed between the first exhaust outlet and the exhaust conduit and is structured to selectively fluidly couple the first exhaust outlet to the exhaust conduit. Also, the lean $NO_x$ catalyst has an inlet structured to receive exhaust gases from the exhaust conduit at a position downstream of the turbine outlet and the fluid control valve.

10 Claims, 5 Drawing Sheets

(51) Int. Cl.
*F02M 25/07* (2006.01)
*F01N 3/08* (2006.01)
*F02D 41/02* (2006.01)
*F02D 41/00* (2006.01)
*F01N 5/04* (2006.01)

(52) U.S. Cl.
CPC ............... *F01N 5/04* (2013.01); *F02B 37/00* (2013.01); *F02B 37/18* (2013.01); *F02B 37/183* (2013.01); *F02D 41/0055* (2013.01); *F02D 41/0082* (2013.01); *F02M 25/0749* (2013.01); *F01N 2260/04* (2013.01); *F01N 2430/02* (2013.01); *F01N 2430/06* (2013.01); *F01N 2560/025* (2013.01); *F01N 2900/08* (2013.01); *F01N 2900/1402* (2013.01); *Y02T 10/144* (2013.01); *Y02T 10/16* (2013.01); *Y02T 10/47* (2013.01)

(58) Field of Classification Search
CPC ........... F01N 2430/06; F01N 2560/025; F01N 2900/08; F01N 2900/1402; F02D 41/0055; F02D 41/0082; F02D 41/0275; F02B 37/00; F02M 25/0749; Y02T 10/144; Y02T 10/16; Y02T 10/47
See application file for complete search history.

(56) References Cited

U.S. PATENT DOCUMENTS

| 8,201,396 | B2 | 6/2012 | Kawamura et al. | |
| 2012/0159948 | A1* | 6/2012 | Moroi | F02D 23/02 60/602 |
| 2012/0260897 | A1 | 10/2012 | Hayman et al. | |
| 2013/0146004 | A1 | 6/2013 | Hayman et al. | |
| 2014/0020382 | A1* | 1/2014 | Subramanian | F02B 29/0406 60/605.2 |
| 2014/0142833 | A1 | 5/2014 | Gingrich et al. | |
| 2014/0196697 | A1 | 7/2014 | Burrahm | |
| 2014/0202433 | A1* | 7/2014 | Dane | F02D 41/0065 123/568.11 |
| 2015/0260128 | A1* | 9/2015 | Roth | F02B 29/06 123/568.13 |
| 2016/0003134 | A1* | 1/2016 | Hodebourg | F02B 37/183 123/559.1 |
| 2016/0025021 | A1* | 1/2016 | Hilditch | F02M 26/16 60/274 |
| 2016/0047287 | A1* | 2/2016 | Roberts, Jr. | F01N 3/2066 60/274 |

FOREIGN PATENT DOCUMENTS

| FR | 3001770 | 8/2014 |
| WO | WO-2014/113526 | 7/2014 |

\* cited by examiner

SYSTEMS AND METHODS FOR AFTERTREATMENT REGENERATION WITH DEDICATED EGR

CROSS REFERENCE TO RELATED APPLICATIONS

The present application claims the benefit of priority to Great Britain Application No. 1414289.7, filed Aug. 12, 2014, and the contents of which are incorporated herein by reference in its entirety.

TECHNICAL FIELD

The present disclosure relates generally to improved efficiency and emissions of engine systems.

BACKGROUND

Efficiency loss and harmful emissions remain a concern for many engine systems. For instance, stoichiometric spark ignited engines suffer several efficiency loss mechanisms in their most basic configuration that reduce their fuel economy as compared to compression ignited diesel engines. Losses common in engine systems such as increased in-cylinder heat losses, increased pumping losses at part load, and higher combustion efficiency losses all contribute to the overall efficiency loss. Processes such as dilution contribute to a diesel engine's efficiency advantage but is less feasible on a homogeneous combustion engine. In particular, as the gasoline combustion process is "leaned out" through air dilution, combustion stability issues and efficiency losses mount quickly, having limited air-fuel ratios to work with without extraordinary, and costly, measures. A diesel engine having a relatively concentrated inhomogeneous combustion process often stably operates at relative air-fuel ratios greater gasoline limit.

Along with efficiency standards, the engine industry is also concerned with engine emissions. Even at dilute conditions, gasoline combustion exhibit emissions that are higher than acceptable by governing agencies and company standards. Current options for controlling post combustion catalytic reduction of NOx emission in a "lean" running engine include using a selective catalytic reduction (SCR) system based upon ammonia as reductant, which requires a second on-board system to supply ammonia. A lean NOx trap may also be used for controlling post combustion catalytic reduction of NOx. However, the lean NOx trap requires periodic regeneration or desorption of NOx in a reducing environment for chemical reduction.

SUMMARY

The systems and methods described below, in one example, allow for efficient regeneration of an aftertreatment component and efficient running of an engine system with fewer loss mechanisms by enabling a normally stoichiometric engine to operate lean more often without having to operate normally lean running cylinders rich. Various embodiments provide for an engine system comprising an engine, a turbocharger, a fluid control valve, and an aftertreatment component such as a lean $NO_x$ catalyst or lean $NO_x$ trap. The engine has a first set of cylinders having a first exhaust outlet fluidly coupled to an intake manifold of the engine. The engine also comprises a second set of cylinders having a second exhaust outlet fluidly isolated from the intake manifold of the engine. The turbocharger includes a turbine inlet fluidly coupled to the second exhaust outlet and a turbine outlet fluidly coupled to an exhaust conduit. The fluid control valve is disposed between the first exhaust outlet and the exhaust conduit and is structured to selectively fluidly couple the first exhaust outlet to the exhaust conduit. Also, the aftertreatment component has an inlet structured to receive exhaust gases from the exhaust conduit at a position downstream of the turbine outlet and the fluid control valve.

According to another example, a control system for regeneration of an aftertreatment component, such as a lean $NO_x$ catalyst or lean $NO_x$ trap, within an engine system is described. The engine system comprises an engine, a turbocharger, and a fluid control valve. The engine has a first set of cylinders with a first exhaust outlet fluidly coupled to an intake manifold of the engine. The engine also has a second set of cylinders with a second exhaust outlet fluidly isolated from the intake manifold of the engine. The turbocharger comprises a turbine inlet fluidly coupled to the second exhaust outlet and a turbine outlet fluidly coupled to an exhaust conduit. The fluid control valve is disposed between the first exhaust outlet and the exhaust conduit and is structured to selectively fluidly couple the first exhaust outlet to the exhaust conduit. The aftertreatment component has an inlet structured to receive exhaust gases from the exhaust conduit and is positioned downstream of the turbine outlet and the fluid control valve. The control system comprises a processor and non-transitory machine-readable media having instructions thereon executable by a processor to receive information, including a current exhaust lambda value, from a sensor communicatively coupled to the aftertreatment component. The processor may also execute instructions to interpret an exhaust lambda target value and operate the fluid control valve in response to the current exhaust lambda value and the exhaust lambda target value.

In another embodiment, an exhaust recirculation method may comprise receiving air in a first set of cylinders fluidly coupled to an intake manifold of an engine and a second set of cylinders fluidly isolated from the intake manifold. The method also comprises intaking a first ratio of an air/fuel mixture into the first set of cylinders. The method further comprises intaking a second ratio of an air/fuel mixture into the second set of cylinders, the second ratio of air/fuel mixture having a greater lambda value than the first ratio of air/fuel mixture. The method additionally may comprise creating a combustion resulting in exhaust gas in the first set of cylinders and the second set of cylinders. The method comprises routing the exhaust gas created by the combustion in the first set of cylinders to the intake manifold to be received by the engine. The method also comprises routing the exhaust gas created by the combustion in the second set of cylinders through an exhaust manifold fluidly coupled to the second set of cylinders towards an aftertreatment component downstream the exhaust manifold. The method further comprises periodically routing the exhaust gas from the first set of cylinders towards the aftertreatment component to regenerate the aftertreatment component.

According to still another embodiment, a controller for use in an engine system is disclosed comprising an exhaust conditions module, a regeneration schedule module, and a regeneration module. The exhaust conditions module is structured to interpret a current exhaust lambda value of exhaust gases from the engine system. The engine system comprises an engine having a first set of cylinders having a first exhaust outlet fluidly coupled to an intake manifold of the engine and a second set of cylinders having a second exhaust outlet fluidly isolated from the intake manifold of the engine. The engine system also comprises a turbocharger having a turbine inlet fluidly coupled to the second exhaust outlet and a turbine outlet fluidly coupled to an exhaust conduit. The engine system further comprises a fluid control valve disposed between the first exhaust outlet and the exhaust conduit, the fluid control valve being structured to selectively fluidly couple the first exhaust outlet to the exhaust conduit. The engine system also comprises an aftertreatment component having an inlet structured to receive exhaust gases from the exhaust conduit at a position downstream of the turbine outlet and the fluid control valve. The regeneration schedule module is structured to interpret an exhaust lambda target value. The regeneration module is configured to operate the fluid control valve in response to the current exhaust lambda value and the exhaust lambda target value.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein.

DETAILED DESCRIPTION OF VARIOUS EMBODIMENTS

Figure 1:
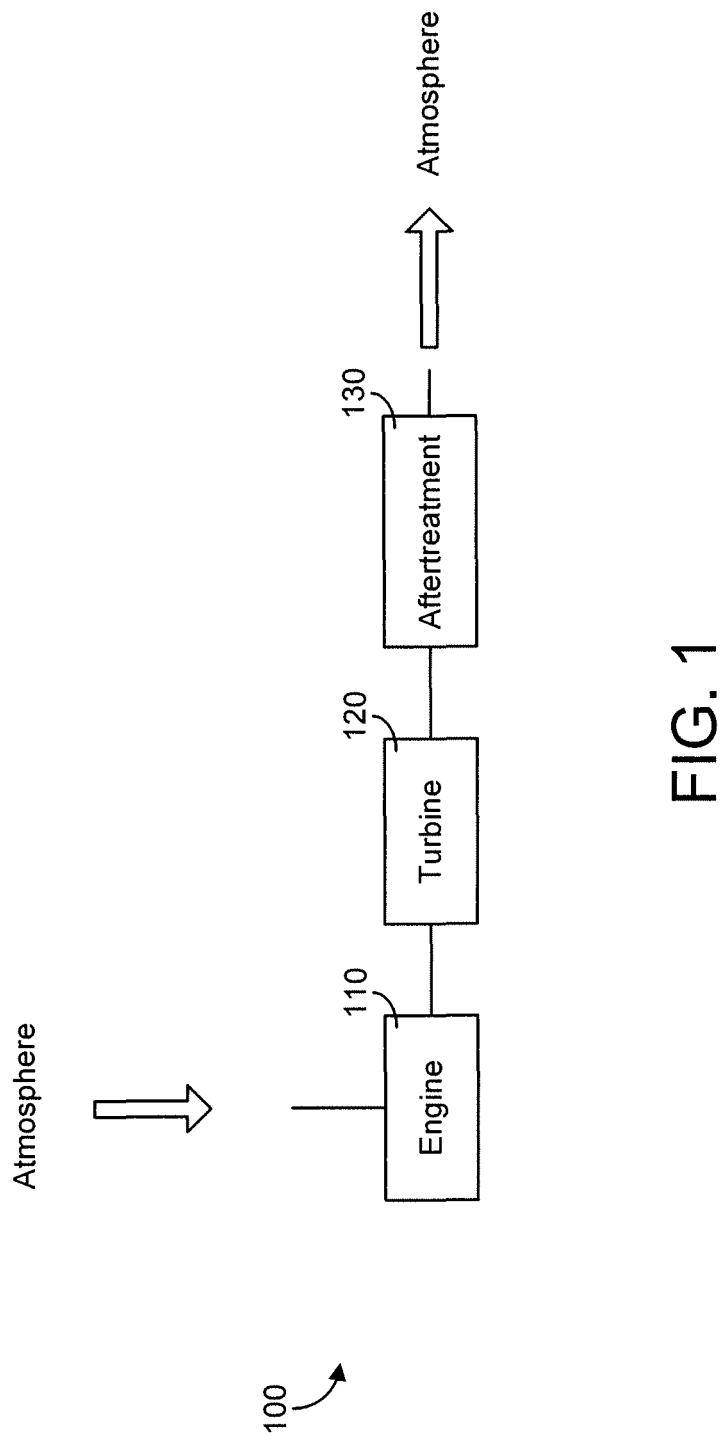
FIG. 1 is a perspective view of an engine system according to an exemplary embodiment.

The systems and methods described below provide for an engine system with dedicated cylinders capable of routing exhaust gases toward an intake manifold and periodically routing exhaust gas towards an aftertreatment component for regeneration. The systems and methods may enable complete and stable combustion at higher air-fuel ratio, which can improve the efficiency of engines (for example, gasoline) by enabling lean operation. Referring to FIG. 1A, a perspective view of an engine system 100 is shown, including an engine 110, a turbocharger 120, and an aftertreatment component 130. The figure shows air being drawn into the engine 110 from the atmosphere. The air may travel through other components within an engine system 100 known in the art (not shown in FIG. 1) prior to reaching the engine 110. Such components may include a charge air cooler, which is discussed further below. The engine 110 may comprise a variety of engines, including internal combustion engines, external combustion engines, air-breathing engines, etc. In one embodiment, the engine 110 serves as a prime mover in a vehicle to receive and modify energy so that the energy can be transferred into mechanical energy. In one embodiment, the engine 110 is an internal combustion engine, such as a spark ignited engine. In another example, the engine 100 is a diesel engine.

The engine 110 may contain a plurality of cylinders, each having a piston seated within and designed to move within the chamber to assist the combustion process. Each piston is communicatively connected to a rotating crankshaft that facilitates the movement of the piston within a cylinder of the engine 110. The movement of the pistons (for example, a stroke) represent periods characterizing combustion stages within the cylinder. For example, in a four-stroke cycle of an internal combustion engine, the first stroke draws air in (and fuel for spark-ignited engines) from an intake manifold channel, and the second stroke may compress the air (or air/fuel mixture) drawn in during the first stroke such that a combustion may occur either from a spark or heat of compression. The third stroke is characterized by the force from the combustion pushing oppositely on the pistons that causes power to be applied from the piston to the crankshaft, and the fourth stroke comprises discharging the exhaust created by the combustion within the cylinder. Internal combustion engines employing other cycle/stroke mechanisms each have a stage in which exhaust gas is created from the internal combustion and a stage in which the exhaust gases are released from the cylinder to regulate the pressure and thermal efficiency of the system.

Where the engine 110 is an internal combustion engine, cylinders within engine 110 have an air-fuel ratio, which refers to the amount of air compared with fuel mixture used in the combustion process. The engine 110, or individual cylinders within the engine 110 may be configured to run lean, stoichiometric, and/or rich. An engine 110 runs stoichiometric when just enough air is provided for the combustion process to completely burn all of the fuel. When a cylinder receives a lower amount of air needed to burn all of the fuel, the cylinder runs rich. A rich mixture corresponds to a low air-fuel ratio. Thus, the richer the air/fuel mixture, the lower the air-fuel ratio. Conversely, when a cylinder receives more air than needed to burn all of the fuel, the cylinder runs lean. A lean mixture corresponds to a high air-fuel ratio. Thus, the leaner the mixture, the higher the air-fuel ratio.

The engine 110 may be mechanically communicatively connected to a turbocharger 120, which receives exhaust gases exiting the engine. A turbocharger 120 employs the use of engine exhaust to breathe more air into a cylinder chamber and to cause a greater combustion. In some embodiments, an increased amount of fuel is also channeled into the cylinder with the increased amount of air. The exhaust gas exiting an engine 100 may be channeled to enter a turbocharger 120, and the force of the exiting exhaust is applied such that the exhaust spins a turbine wheel connected by a shaft to a compressor wheel in the turbocharger 120. The motion of the compressor wheel creates a suction force that forces air into the engine 110. This air is drawn in from the atmosphere as shown in FIG. 1 and/or the air may comprise exhaust gases recirculated from engine cylinders, as described further below. In some embodiments, the air travels through an air cooler, thus further increasing the density of the air. Once in the engine 110, the air allows the engine 110 to burn more fuel and increases the output of the overall engine 100.

The engine 110 is also connected to an aftertreatment component 130 within the engine system 100. The aftertreatment component 130 receives emissions from the engine cylinders and alters the chemical state of the emissions such that the final product leaving the aftertreatment to enter the atmosphere is a more innocuous substance. Emissions from engine systems may comprise of harmful substances such as hydrocarbons, carbon monoxide, nitrogen oxides, particulate matter, sulfur oxide, volatile organic compounds, etc. The engine system 100 employs a variety of aftertreatment components 130 and technologies for treating exhaust gas emissions including, for example, a lean NOx trap (LNT), a catalytic converter (e.g., three-way), a selective catalytic reduction catalyst, etc. In some embodiments, the aftertreatment component 130 comprises a series of inner components used to fully treat the exhaust exiting the engine 110 cylinders.

According to one embodiment, one such aftertreatment component 130 is a lean NOx trap (LNT). The LNT is a device used to reduce nitrogen oxides and nitrogen dioxide emissions from a lean burn internal engine 110 by "trapping" nitrogen molecules. The LNT contains an adsorber material, such as a zeolite or a Group II metal such as barium and potassium, that behaves as a molecular sponge and adsorbs molecules in the exhaust gas. In one example, the LNT is configured to adsorb nitrogen oxides. Once the material is saturated with molecules and can no longer sufficiently trap additional substances within the exhaust gas, the material can be purged or regenerated to empty the trapped molecules and allow for further trapping of molecules. The process of purging or regenerating the LNT is referred to as regeneration. The regeneration process may take place a number of ways, including inserting fuel, an air/fuel mixture, or some other reactant into the LNT to release the adsorbed molecules. The incoming exhaust stream to the LNT has little or no oxygen therein, such that the stored NOx can be effectively released. For this reason, the non-dedicated cylinders (discussed in greater detail below) may move from a lean operating condition to a stoichiometric operating condition. The reactant channeled to the LNT releases the trapped molecules by chemically reducing the molecules to other substances, such as water and carbon dioxide, for example. In one example, the LNT best reduces emissions when the engine 110 is running lean. The regeneration of the aftertreatment component 130 may be increased with low space velocity of gas entering the aftertreatment component 130. A low space velocity allows the regenerating gases to linger in the aftertreatment component 130 for sufficient amount of time to allow the chemical reactions to occur, providing for full and complete regeneration.

The catalytic converter (e.g., a three-way catalytic converter) is a device used to convert harmful emissions into non-toxic end product that will be released into the atmosphere. This device works with gasoline engines running stoichiometric. The catalytic converter converts the emissions by creating a chemical reaction with the exhaust gasses, which may contain nitrogen oxide, hydrocarbons, carbon monoxides, etc. The exhaust gasses pass through a honeycomb structure coated with substances such as aluminum oxide, platinum, and palladium that promote the oxidation process. The exhaust gas chemically reacts with the substances to produce new chemical compounds. For example, carbon monoxide interacts with the surfaces to produce carbon dioxide, nitrogen results from nitrogen oxides, and hydrocarbons interact to produce water and carbon dioxide. In one example, the catalytic converter is used on stoichiometric internal combustion engines. According to one embodiment, the catalytic converter is used in combination with the LNT to reduce emissions.

Once the exhaust emissions leave the engine 110 and pass through the aftertreatment component 130, the exhaust emissions are transferred into a more innocuous state and released into the atmosphere. In some embodiments, the exhaust gas travels through a muffler designed to decrease engine 110 noise and out through a tail pipe. In another example, the engine system 100 includes a plurality of aftertreatment components 130, and the plurality of aftertreatment components 130 may differ in type. In one embodiment, the engine system 100 includes two LNT components applied to a plurality of catalysts, or the engine system 100 includes an LNT and a three-way catalytic converter.

Figure 2:
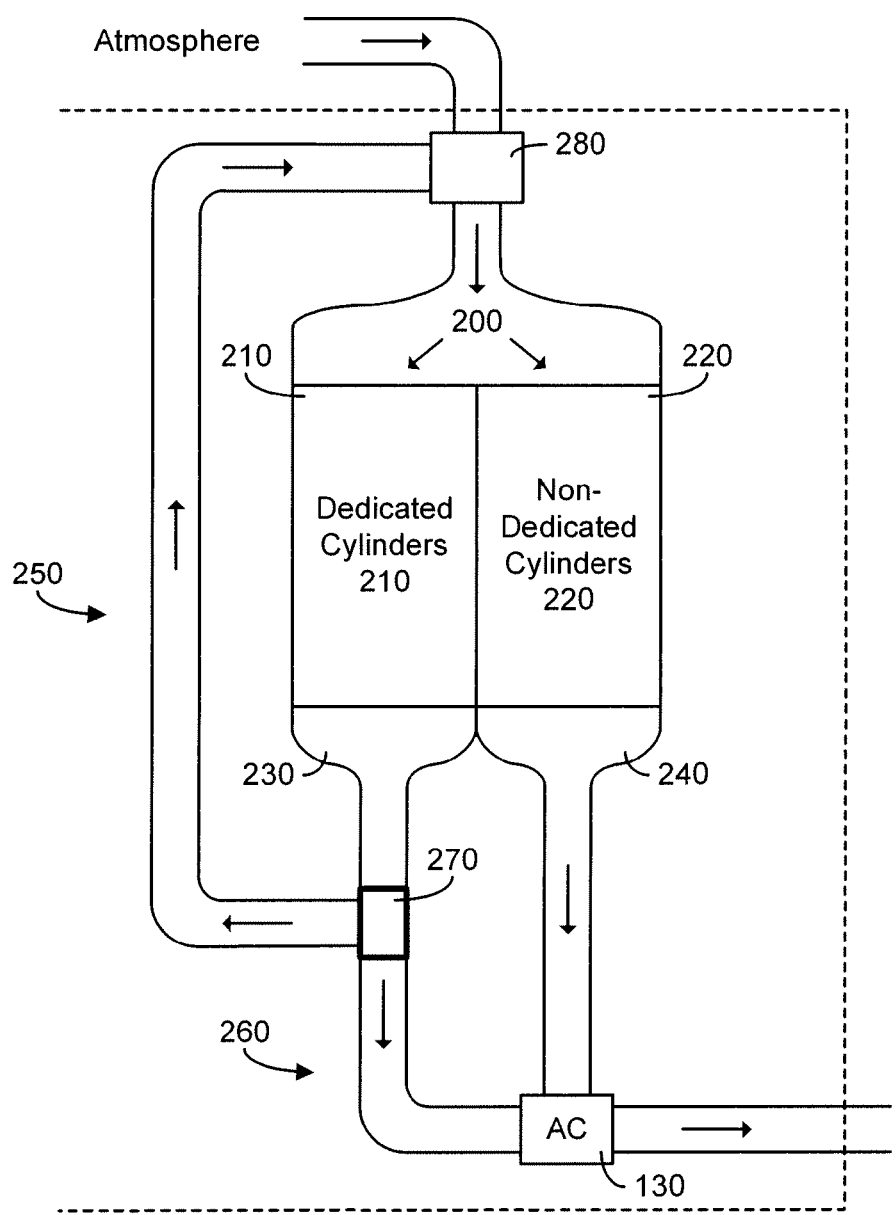
FIG. 2 is a detailed view of an engine system of FIG. 1.

Referring to FIG. 2, a detailed view of an engine system 100 according to an example embodiment is shown. FIG. 2 shows air coming in from an atmosphere and entering an inlet unit 280. In one example the inlet unit 280 serves a variety of functions. For example the inlet unit 280 may comprise an inter cooler configured to cool air coming into the engine 110 from the atmosphere, or the inlet unit 280 may also cool the air being routed into the engine 110 from the dedicated cylinders. The inlet unit 280 may also serve as a chamber where air from the atmosphere and recirculated exhaust gas combines to enter into the intake manifold 200 of the engine 110. According to one example embodiment, the inlet unit 280 is a charge air cooler or an air-to-liquid intercooler.

The intake manifold 200 is configured to collect substances such as exhaust gas, engine air, fluids, etc., flowing from other parts of the engine system 100. The intake manifold is communicatively coupled to the engine 110 such that the intake manifold directs substances and/or fluids collected into the intake manifold towards the cylinders of the engine 110. The intake manifold is configured with channels that attach separately to each cylinder within the engine 110, or the intake manifold may contain channels that attach to a plurality of cylinders. According to another example, a plurality of intake manifolds attach to cylinders in the engine system 100. For example, some dedicated cylinders are communicatively coupled to a first intake manifold and other cylinders are communicatively coupled to a second intake manifold.

Referring still to FIG. 2, the engine 110 contain a set of dedicated cylinders 210 and a set of non-dedicated cylinders 220. The cylinders comprising the set of dedicated cylinders 210 are "dedicated" to recirculating exhaust gas exiting throughout the engine. According to some embodiments, the cylinders within the set of dedicated cylinders 210 are configured to run rich and periodically regenerate the aftertreatment component 130. For example the set of dedicated cylinders 210 may have a lower air-fuel ratio than a stoichiometric mixture. On the other hand, the non-dedicated cylinders 220 may run less rich than the dedicated cylinders 210. According to one example, the non-dedicated cylinders 220 may run lean, thus the cylinders may contain a higher air-fuel ratio above stoichiometric. The set of dedicated cylinders 210 and set of non-dedicated cylinders 220 may comprise a plurality of individual cylinders within the each set. Each set may have the same number of cylinders or the sets may have a different number of cylinders. For example, the set of dedicated cylinders 210 may comprise a single cylinder whereas the set of non-dedicated cylinders 220 may comprise three cylinders. The individual cylinders of the set of dedicated cylinders 210 and set of non-dedicated cylinders 220 may be grouped together, or the cylinders may be placed in alternating or semi-alternating patterns. For example, in an engine 110 having three cylinders, the middle cylinder may be the dedicated cylinder 210 and the remaining two cylinders on each side of the dedicated cylinder 210 may be the non-dedicated cylinders 220, and vice versa. According to another embodiment, the number of cylinders within the set of dedicated cylinders 210 is less than the number of cylinders in the set of non-dedicated cylinders 220.

The engine system 100 may be equipped with an exhaust manifold communicatively coupled to the cylinders engine 110. The exhaust manifold is a structure that collects exhaust gases from individual or multiple cylinders into piping structure to channel the exhaust to several places. The engine system 100 contains one exhaust manifold with channel structures and valves for directing the exhaust or the engine system 100 may contain a plurality of exhaust manifolds. In FIG. 2, an exhaust manifold 230 is shown coupled to the set of dedicated cylinders 210 to collect the exhaust exiting the dedicated cylinders 210. A second exhaust manifold 240 is also shown coupled to the set of non-dedicated cylinders 220 to collect exhaust exiting the non-dedicated cylinders 220. The exhaust exiting the non-dedicated cylinders 220 are channeled toward the aftertreatment component 130 and out toward the atmosphere. This exhaust comprises a higher air/fuel ratio than the exhaust exiting the set of dedicated cylinders 210. The exhaust exiting the dedicated cylinders 210 may flow through the exhaust manifold 230 toward a valve 270, which may be connected at a junction point within the piping or channels to control the direction of the flow of the exhaust. The exhaust manifold (and/or exhaust manifold 230 and exhaust manifold 240) may be located on the same side of the engine 110 as the intake manifold 200 or on different sides.

During normal operation, the exhaust from the set of dedicated cylinders 210 running rich is recirculated throughout the engine 110. Operating the dedicated cylinders 210 rich allows for the production and recirculation of increased levels of hydrogen and carbon monoxide, which provide significant benefits for combustion including reduction in ignition delay and improved laminar flame speed. The recirculation of higher levels of hydrogen and carbon monoxide also improves engine thermal efficiency, supports stable lean combustion, and improves the lean limit of the non-dedicated cylinders 220. Thus, the valve 270 may operate to direct all of the exhaust flowing from the dedicated cylinders 210 through a recirculation route 250 that channels the exhaust towards the intake manifold 200. In some embodiments, the recirculation route 250 connects directly to the intake manifold 200, or the recirculation route 250 is configured to route the exhaust through an inlet unit 280 prior upstream the intake manifold 200.

Periodically, the engine 110 goes through a regeneration cycle, which is an operation cycle for the engine 110 in which the aftertreatment component 130 is regenerated. During the regeneration cycle, all or a portion of the exhaust gas from the set of dedicated cylinders 210 is routed towards the aftertreatment component 130. The valve 270 may restrict a portion or all of the exhaust from being recirculated through the recirculation route 250 and may direct the flow of a portion or all of the exhaust gas exiting the exhaust manifold 230 through the regeneration route 260 toward the aftertreatment component 130. Described in greater detail below, the dedicated cylinders 210 and the non-dedicated cylinders 220 may be configured to run differently during the regeneration cycle. For example, the set of dedicated cylinders 210 are configured to run the same as the set runs during cycles in which the aftertreatment component 130 is not being regenerated (e.g., non-regeneration cycles) whereas the set of non-dedicated cylinders 220 are configured to run less lean or stoichiometric during the regeneration cycles than run during non-regeneration cycles.

To run the set of non-dedicated cylinders 220 lean, an exhaust manifold may be fitted with an LNT aftertreatment component 130 to adsorb and hold nitrogen emissions during a storage period. A variety of hardware and control systems and methods may be established to periodically provide the exhaust gas from the set of dedicated cylinders 210 to the LNT aftertreatment component 130 for regeneration. For example, a variety of valves and re-routing mechanism are used. The systems and methods may use control valves to control the flow of the exhaust gases by opening or closing flow paths and channels in response to particular signals. The types of control valves used comprises angle valves, angle seat piston valves, globe valves, three-way valves, air-operating valves, sliding cylinder valves, diaphragm valves, bypass valves, etc. Example embodiments of systems and methods are described in greater detail below.

Figure 3A:
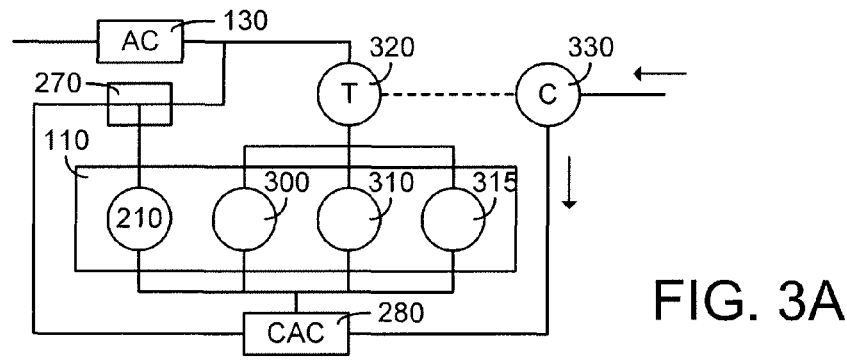
FIG. 3A is a schematic drawing of an engine system routing a dedicated cylinder to an aftertreatment component for regeneration.

FIG. 3A is a schematic drawing of an engine system 100 routing a dedicated cylinder to an aftertreatment component for regeneration according to an example embodiment. The engine 110 within the engine system 100 comprises a group four cylinders. The set of dedicated cylinders 210 includes one cylinder, and the set of non-dedicated cylinders 300, 310, and 315 comprises three cylinders. Air is shown coming in and passing through the compressor 330 to an inlet unit 280, where the inlet unit 280 is a charge air cooler (CAC). The CAC connects to the dedicated cylinder 210 and to each of the non-dedicated cylinders 300, 310, 315. Exhaust gas from the non-dedicated cylinders 300, 310, 315 is collected in an exhaust manifold and routed toward the turbine 320 of the turbocharger 120, which in turn routes the exhaust gas towards the aftertreatment component 130. The aftertreatment component 130 according to one example is an LNT. Exhaust from the dedicated cylinder 210 exits the cylinder and approach a junction having a valve 270 mechanism capable of routing the gases in several directions. As shown in FIG. 3A, the exhaust may be routed upstream the engine 110 towards the CAC 280 to be cooled and further routed toward the engine 110 to be taken into the dedicated cylinder 210 and the non-dedicated cylinders 300, 310, 315. In a normal, non-regeneration cycle of the engine 110, rich exhaust gas from the dedicated cylinder 210 primarily exits the engine system 100 through the non-dedicated cylinders 300, 310, 315. During a regeneration cycle, the rich exhaust gas from the dedicated cylinder 210 is circuited directly to the LNT aftertreatment component 130. In one example, a simple on/off valve is connected between the dedicated cylinder 210 exhaust manifold and the turbine outlet 320 before the LNT aftertreatment component 130. In such a system, a portion of the exhaust from the dedicated cylinder 210 is diverted toward the tailpipe. No change in the charge flow or lambda value for the non-dedicated cylinders 300, 310, 315 would occur; thus the non-dedicated cylinders 300, 310, 315 continue to run lean.

Figure 3B:
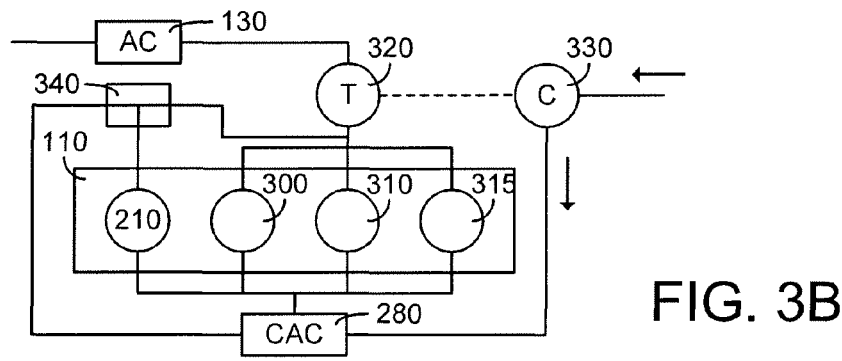
FIG. 3B is a schematic drawing of an engine system routing a dedicated cylinder to an aftertreatment component through a turbine for regeneration.

FIG. 3B is a schematic drawing of an engine system 100 routing a dedicated cylinder to an aftertreatment component 130 through a turbine outlet 320 for regeneration. Air passes through the compressor 330 to an inlet unit 280, where in the inlet unit 280 is a charge air cooler (CAC). As described above, the CAC may connect to the dedicated cylinder 210 and to each of the non-dedicated cylinders 300, 310, 315. The non-dedicated cylinders 300, 310, 315 runs lean and the exhaust gas from the non-dedicated cylinders 300, 310, 315 is collected in an exhaust manifold and routed toward the turbine 320 of the turbocharger 120, which in turn routes the exhaust gas towards the aftertreatment component 130 (e.g., the LNT). Exhaust from the dedicated cylinder 210 exits the cylinder and approaches a junction having a valve 340 mechanism capable of routing the gases in several directions. The valve 340 may be a bypass valve (also known as a blow-off valve or dump valve), which facilitates the diversion of the exhaust gas. As shown on FIG. 3B, the exhaust may be routed upstream the engine 110 towards the CAC 280 to be cooled and further routed toward the intake manifold to be taken into the dedicated cylinder 210 and the non-dedicated cylinders 300, 310, 315. According to one embodiment, the engine system 100 may divert all of the exhaust from the dedicated cylinder 210 to the exhaust manifold to be directed toward a turbine outlet 320 and an aftertreatment component 130 downstream the turbine outlet 320. Such diversion occurs during a regeneration cycle, and there may be no change in the charge flow or lambda value for the non-dedicated cylinders 300, 310, 315.

Figure 3C:
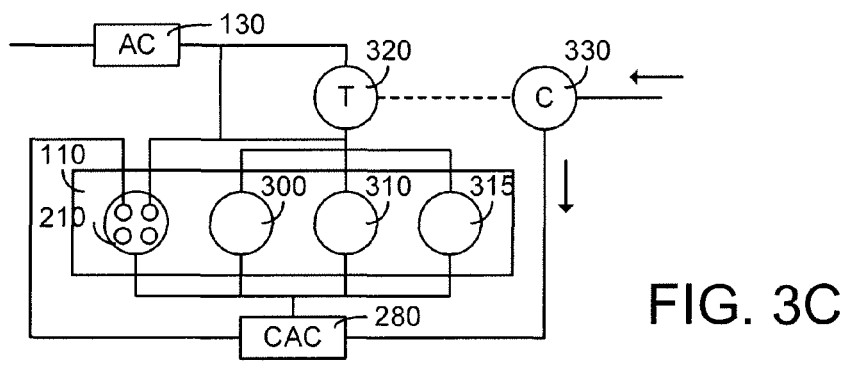
FIG. 3C is a schematic drawing of an engine system of FIG. 3A or FIG. 3B with feedback control and cylinder deactivation capabilities.

FIG. 3C is a schematic drawing of an engine system 100 of FIG. 3A or FIG. 3B with feedback control and cylinder deactivation capabilities. In one embodiment, when the non-dedicated cylinders 300, 310, 315 are running net lean then the aftertreatment component 130 may need to reach a net rich environment in order to regenerate during the regeneration cycle. For example, the non-dedicated cylinders 300, 310, 315 may need to be run stoichiometric during the regeneration cycle in order to facilitate the regeneration process of the aftertreatment component 130. In another example, the non-dedicated cylinders 300, 310, 315 are run less lean during the regeneration cycle. Running the non-dedicated cylinders 300, 310, 315 less lean or stoichiometric during the regeneration cycle—as opposed to the normal operation of the cylinders outside the regeneration cycle—helps facilitate the regeneration of the aftertreatment component 130 by lowering the exhaust oxygen concentration. Individual cylinders within the set of non-dedicated cylinders 300, 310, 315 may be operated variously during the regeneration cycle to facilitate the regeneration process. For example, some of the cylinders may be operated stoichiometric, whereas the other cylinders may be operated less lean. Some of the cylinders may shut off and cease to operate during the regeneration cycle while the remaining cylinders may operate at the same ratio, at a less lean ratio, or stoichiometric. In another example, all of the non-dedicated cylinders 220 may shut off and cease to operate during the regeneration cycle. In yet another example, all of the cylinders operate less lean but to varying degrees (i.e., all non-dedicated cylinders 300, 310, 315 may operate near an air-fuel ratio of 30:1 during normal operation wherein during regeneration cycles, the non-dedicated cylinder 300 may operate at 25:1, non-dedicated cylinder 310 may operate at 20:1, and non-dedicated cylinder 315 may operate at 18:1).

FIG. 3C shows the dedicated cylinder 210 being re-routed upstream the engine 110 toward the CAC 280. FIG. 3C also shows the engine system 100 routing exhaust from the dedicated cylinder 210 toward the aftertreatment component 130 and/or routing the exhaust toward the turbine outlet 320. The system comprises any plurality or types of valves or control mechanisms to control or restrict the flow of exhaust gases according to systems and methods described throughout the disclosure. The valve and/or control mechanisms may serve dual functions, such as checking pressure and flow and blocking flow.

The engine system 100 comprises a mechanism for creating a deactivation system during a tip out event. A tip-out event (e.g., an engine load drop event) may occur when a sudden decrease in charge flow is demanded through a driver torque request, up or down, causing the transient differences in cylinder to cylinder exhaust gas recirculation to arise. When the torque request drops, an intake throttle may close to restrict charge flow. However, the engine system 100 may still be at a higher pressure with no place to go, so for a short time, the EGR fraction increases until the exhaust pressure from the dedicated cylinder 210 subsides. During a tip-out event (e.g., low net engine load), the system is configured to deactivate the non-dedicated cylinders 300, 310, 315 to ensure the cylinders do not fire and the rich exhaust from the dedicated cylinder 210 only is directed toward the aftertreatment component 130 upstream the tail pipe. As such, the rich exhaust gas would flow at a low space velocity, enabling a full and complete regeneration event. In some systems, the non-dedicated cylinders 300, 310, 315 only partially deactivate (e.g., only two of the cylinders deactivate while the remaining cylinders continue to ignite).

Figure 3D:
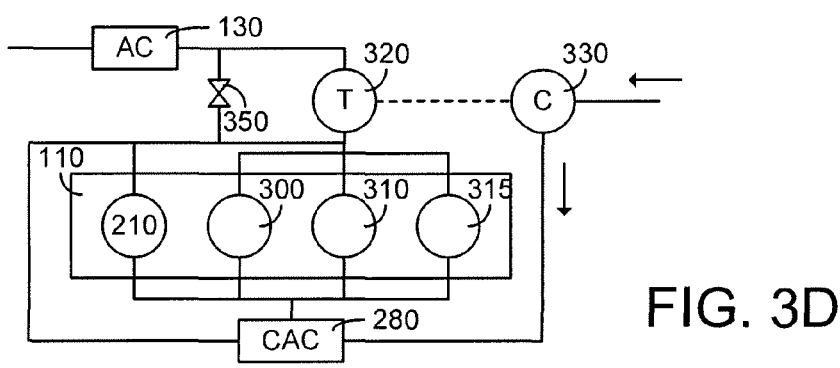
FIG. 3D is a schematic drawing of an engine system routing a dedicated cylinder to an aftertreatment component using a wastegate valve.

FIG. 3D is a schematic drawing of an engine system 110 routing a dedicated cylinder to an aftertreatment component using a wastegate valve 350. The wastegate valve 350 may be located downstream the engine 110 and upstream the aftertreatment component 130. The wastegate valve 350 diverts exhaust gases away from the turbine wheel in the engine system 100. This diversion regulates the speed of the turbine 320, thereby regulating the speed of the connected compressor 330. The wastegate valve 350 protects the turbocharger 120 and engine 110 by regulating the boost pressure. The wastegate valve 350 also regulates the flow of exhaust gases from the dedicated cylinder 210 and the non-dedicated cylinders 300, 310, 315. An outlet of the non-dedicated cylinders 300, 310, 315 is fluidly coupled to an outlet of the dedicated cylinder 210. An outlet of the dedicated cylinder 210 is fluidly coupled to the inlet unit 280. Therefore, an outlet of the non-dedicated cylinders 300, 310, 315 is fluidly coupled to inlet unit 280.

In certain embodiments, the engine system 100 further includes a controller (also see FIG. 4) structured to perform certain operations to operate the engine system 100 according to the operations disclosed throughout the disclosure, including running the cylinders, routing the exhaust gases, and regenerating the aftertreatment component 130. In certain embodiments, the controller forms a portion of a processing subsystem including one or more computing devices having memory, processing, and communication hardware. The controller may comprise a single device or a distributed device, and the functions of the controller may be performed by hardware and/or as computer instructions on a non-transient computer readable storage medium.

In certain embodiments, the controller includes one or more modules structured to functionally execute the operations of the controller. In certain embodiments, the controller includes a combustion management module, a regeneration determination module, and a routing module. The description herein including modules emphasizes the structural independence of the aspects of the controller, and illustrates one grouping of operations and responsibilities of the controller. Other groupings that execute similar overall operations are understood within the scope of the present disclosure. Modules may be implemented in hardware and/or as computer instructions on a non-transient computer readable storage medium, and modules, and or components operating the modules, may be distributed across various hardware or computer based components. More specific descriptions of certain embodiments of controller operations are included in the section referencing FIG. 4.

Example and non-limiting module implementation elements include sensors providing any value, measurement, or information determined herein, sensors providing any value, measurement, or information that is a precursor to a value, measurement, or information determined herein, datalink and/or network hardware including communication chips, oscillating crystals, wireless technology, radio receiver technology, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters. Interpreting or determining, as utilized herein, includes receiving values, measurements, or information by any method known in the art, including at least receiving values, measurements, or information from a datalink or network communication, receiving an electronic signal (e.g. a voltage, frequency, current, or PWM signal) indicative of the value, receiving a computer generated parameter indicative of the value, measurement, or information, reading the value, measurement, or information from a memory location on a non-transient computer readable storage medium, receiving the value, measurement, or information as a run-time parameter by any means known in the art, and/or by receiving the value, measurement, or information by which the interpreted parameter can be calculated, and/or by referencing a default value that is interpreted to be the parameter value.

Figure 4:
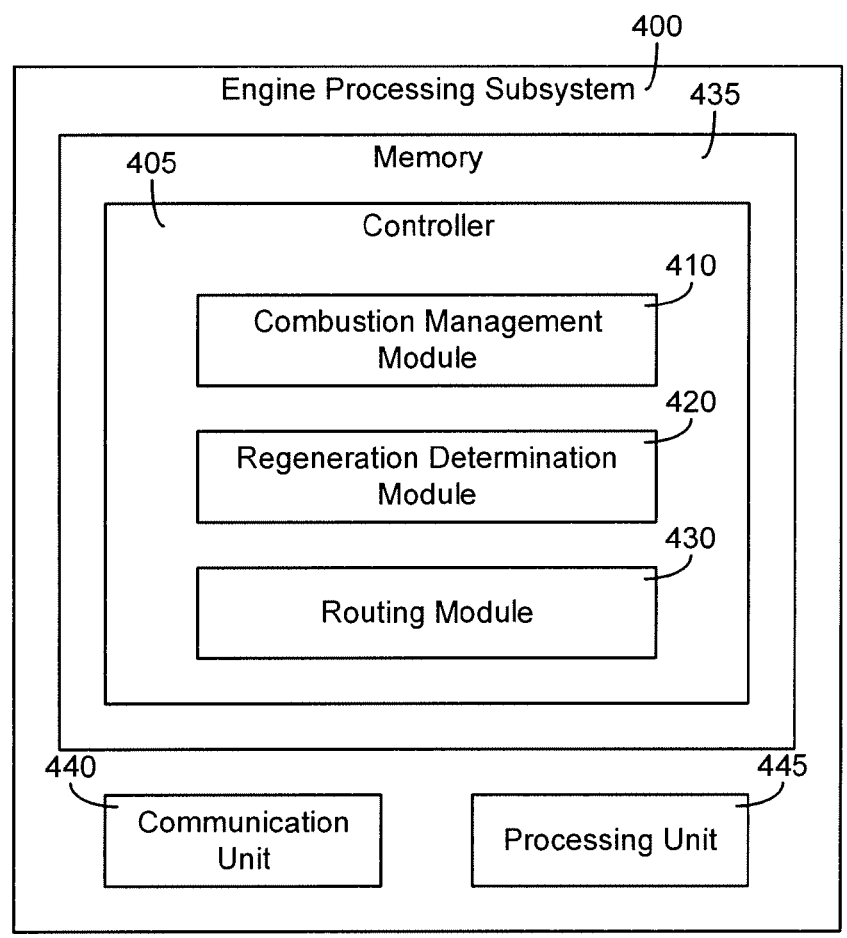
FIG. 4 is a schematic illustration of an example engine processing subsystem 400 including memory 435, a communication unit 440, a processing unit 445, and a controller 405.

FIG. 4 is a schematic illustration of an engine processing subsystem 400 including memory 435, a communication unit 440, a processing unit 445, and a controller 405. The memory 435 may be configured to store instructions (e.g., computer code) to operate and control the engine system 100 and components within the engine system 100 as described throughout the disclosure. The processing unit 445 is configured to execute instructions within the memory 435, and the communication unit 440 comprises hardware and/or software that facilitate mechanical and/or electrical communication. The controller 405 includes a combustion management module 410, a regeneration determination module 420, and a routing module 430. The controller 405 may embody further features and capabilities as described throughout the disclosure.

The combustion management module 410 is configured to manage aspects relating to the combustion process within the cylinders of the engine 110. For example, the management aspects may include shutting down particular cylinders, controlling the ignition timing and process of individual cylinders and collective set of cylinders, and coordinating the air-fuel ratio within the cylinder. The combustion management module 410 is configured to control the operation of the dedicated cylinders 210 and non-dedicated cylinders 220 as rich, lean, and/or stoichiometric. According to one example, the combustion management module manages combustion within a first set of dedicated cylinders 210 and a second set of non-dedicated cylinders 220 of the engine 110, wherein the first set of dedicated cylinders 210 have a first ratio of an air/fuel mixture, the second set of non-dedicated cylinders 220 have a second ratio of an air/fuel mixture, and the second ratio of air/fuel mixture is greater than the first ratio of air/fuel mixture. Controlling the cylinders and combustion operation involve communicating with various parts of the engine system 100 to implement operation of combustion requirements, including systems communicable to a fuel injector, the intake manifold 200, a recirculation route 250, a throttle, a turbine, compressor, turbocharger, inlet unit 280, valves throughout the system, etc. The combustion management module 410 is also configured to communicate with the routing module 430 and the regeneration determination module 420 through various mechanisms described throughout the disclosure, including electrical circuitry, signals, wired and/or wireless networking, etc.

The regeneration determination module 420 may be configured to facilitate the regeneration process of an aftertreatment component 130, including determining when the aftertreatment component 130 should be regenerated. The regeneration determination module 420 communicates with other modules (e.g., the combustion management module 410 and the routing module 430) within the controller 405 to implement the regeneration process. A variety of regeneration operational elements can be managed and/or controlled by the regeneration determination module 420 including timing of the regeneration cycle, determining when the aftertreatment component 130 should be regenerated, determining and measuring a saturation level of the aftertreatment component 130, calculating the a saturation level threshold, running diagnostics on the aftertreatment component 130 and/or engine system 100 components connected with the regeneration process, and diagnosing issues within the regeneration process. In one embodiment, the regeneration determination module 420 is configured to receive user inputs that set the saturation level and threshold of which the regeneration determination module 420 monitors. In another embodiment, the regeneration determination module 420 accepts preset inputs that determine the timing period of a regeneration cycle. For example, the regeneration determination module 420 implements and manages the execution of the regeneration cycle every 60 seconds.

In embodiments having a plurality of aftertreatment components 130 with a plurality of dedicated cylinders 210 to regenerate the aftertreatment components 130, the regeneration determination module 420 coordinates the regeneration process, resources, and timing between aftertreatment components 130. In a certain embodiment, the regeneration determination module 420 may be configured to develop a regeneration plan including instructions executable by a plurality of processors and hardware within the engine system 100 to carryout regeneration of the aftertreatment component 130 using exhaust from the set of dedicated cylinders 210. The regeneration determination module 420 may transfer the instructions from the regeneration plan to the requisite components carrying out regeneration duties.

The routing module 430 facilitates exhaust routing operations throughout the engine system 100. The routing module 430 communicates with various processing systems and/or hardware to implement the routing commands and plans. For example, the routing module 430 communicates with the regeneration determination module 420 and the combustion management module 410. The routing module 430 receives instructions from the regeneration route 260 and combustion management module 410. The routing module may also transfer information regarding components controlled by the routing module 430. According to one example, based upon information provided by the regeneration determination module, the routing module 430 controls the routing of exhaust gas from the first set of dedicated cylinders 210 to the aftertreatment component 130 during a regeneration cycle and to an intake manifold 200 during periods when the regeneration cycle is not occurring. Other components and/or hardware in which the routing module 430 communicates with and controls includes various valves (e.g., bypass, wastegates, on/off switch, check valves, etc.), sensors, testing equipment, etc. The routing module 430 diverts the recirculation route 250 according to instructions for regeneration or normal operation of the engine system 100. The routing module 430 may control several channels within the engine system 100, including hoses, pipes, manifolds (for example, intake and exhaust), etc.

The schematic flow diagram and related description which follows provides an illustrative embodiment of performing procedures for implementing an exhaust recirculation method. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

According to one embodiment, the controller 405 of the engine system 100 enters a regeneration cycle having the aftertreatment component 130 regenerated based on a preset time or periodic cycle. In another embodiment, the engine 110 regenerates the aftertreatment component 130 based on observations, detection, and measurements of a saturation level of the molecules within the aftertreatment component 130.

Figure 5:
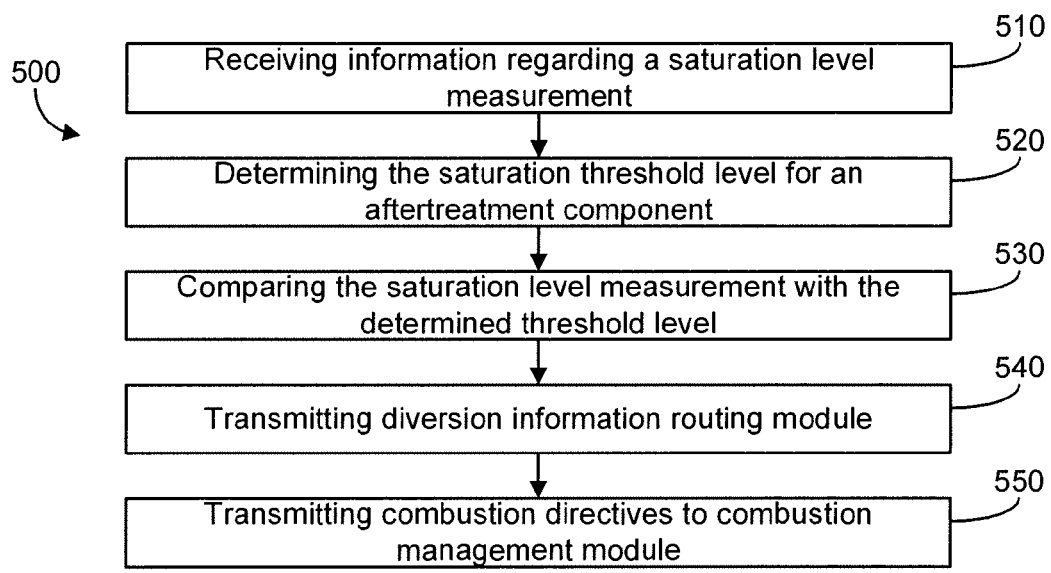
FIG. 5 is a flow diagram of regeneration method of the engine system occurring during a regeneration cycle.

Referring to FIG. 5, a flow diagram of a regeneration method of the engine system 100 occurring during a regeneration cycle is shown according to an exemplary embodiment. At 510, information is received regarding a saturation level measurement. The saturation level measurement indicates how saturated the aftertreatment component 130 is with exhaust molecules. In one example, the saturation level measurement of a lean NOx trap indicates the amount of nitrogen oxides trapped within the lean NOx trap. Components within the engine system 100, such as the engine 110 and the recirculation route 250, receive information regarding the saturation level in the aftertreatment component 130. The components then use the saturation level to alter the performance of the components. Additionally, control system units such as the regeneration determination module 420, the combustion management module 410, and the routing module 430 receive information related to the saturation level in an aftertreatment component 130.

At 520, the saturation threshold level for an aftertreatment component 130 is determined. The saturation threshold level is determined by the controller 405 using the regeneration determination module 420. In one example, the saturation threshold level is determined based upon operational feedback from other components within the engine system 100, including the engine 110, the set of dedicated cylinders 210, the set of non-dedicated cylinders 220, the inlet unit 280, the aftertreatment component 130, the turbocharger 120, etc. According to one embodiment, the saturation threshold level is a preset value entered into a processing system to control and monitor regeneration. In another example, the saturation threshold level varies according to the type of aftertreatment component 130 used, the plurality of aftertreatment components 130 used, the lean/rich operation of the cylinders as described throughout, the etc.

At 530, the saturation level measurement is compared with the determined threshold level. The measured saturation level is compared to a determined saturation threshold to monitor the efficacy of the aftertreatment component 130 and to determine when the regeneration cycle should be implemented. The regeneration determination module 420, the combustion management module 410, and/or the routing module 430 may be configured to compare the measured saturation level against the saturation threshold and send the comparison information to several components within the engine system 100. According to one embodiment, if the saturation level is below the threshold level, then the engine system 100 continues to operate normally without entering a regeneration cycle. The normal operation of the engine system 100 (for example, when regeneration cycles are not occurring) includes running dedicated cylinders 210 rich and routing the created exhaust upstream the engine 110 towards and intake manifold 200 while the non-dedicated cylinders 220 are run less rich than the dedicated cylinders 210 and the resulting exhaust is routed downstream the engine 110 towards atmosphere. According to another embodiment, if the saturation level approaches, reaches, or surpasses the threshold level, the engine system 100 is configured to initiate and implement a regeneration cycle using the controller 405, the regeneration determination module 420, the routing module 430, and the combustion management module 410. The comparison between an observed saturation level and a threshold level may be made periodically and/or continuously throughout the engine running process.

Still referring to FIG. 5, at 540, diversion information is transmitted to the routing module 430. The regeneration route 260 is configured to transmit the information to the routing module 430 within the engine system 100. Upon receiving information regarding the comparison of the observed saturation level to the threshold saturation level, the engine system 100 transmits information regarding the diversion of the exhaust gas from the dedicated cylinders 210 to a component controlling the direction of the exhaust gas. In one example, the recirculation route 250 is instructed by the routing module 430 to shutoff valves allowing the exhaust gas from the dedicated cylinders 210 to be routed through the recirculation route 250 into the intake manifold 200 of the engine 110. The information may be transmitted through electrical circuits and/or wired and wireless communication between the modules and/or between hardware connected to the engine.

At 550, combustion directives are transmitted to the combustion management module. Upon determining that the observed saturation level has approached or surpassed a threshold level, the regeneration determination module 420 transfers directives to the combustion management module 410 to implement appropriate combustion within the cylinders to carry out a regeneration process according to regeneration plans created by or input and stored into the regeneration determination module 420. The directives include instructions to carry out processes as described throughout the disclosure, including maintaining or increasing the rich combustion of the dedicated cylinders 210, maintaining or decreasing the air-fuel ratio of the non-dedicated cylinders 220, shutting down the non-dedicated cylinders 220, etc. The combustion management module 410 receives directives to implement the instructions above to a particular degree or at particular ratios. For example, the combustion management module 410 receives instructions to run the non-dedicated cylinders 220 at a specific air-fuel ratio. Additionally, the combustion management module 410 receives instructions for individual cylinders within a set of dedicated cylinders 210 and a set of non-dedicated cylinders 220.

The foregoing description of embodiments of the disclosure has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the disclosure in various embodiments and with various modifications as are suited to the particular use contemplated. Other substitutions, modifications, changes and omissions may be made in the disclosure's operating conditions and arrangement of the embodiments without departing from the scope of the present invention.

What is claimed is:

1. An engine system comprising:
   an engine having a first set of cylinders having a first exhaust outlet fluidly coupled to an intake manifold of the engine and a second set of cylinders having a second exhaust outlet fluidly coupled to the intake manifold of the engine such that the first set of cylinders are fluidly coupled to the second set of cylinders;
   a turbine having a turbine inlet fluidly coupled to the first exhaust outlet and the second exhaust outlet and a turbine outlet fluidly coupled to an exhaust conduit;
   an aftertreatment component having an inlet structured to receive exhaust gases from the exhaust conduit at a position downstream of the turbine outlet; and
   a fluid control valve operable between an open position and a closed position, the fluid control valve disposed between the exhaust conduit and both of the first exhaust outlet and the second exhaust outlet such that the first set of cylinders are fluidly coupled to the second set of cylinders upstream of the fluid control valve when the fluid control valve is in the open position and the closed position.

2. The engine system of claim 1, further comprising a selective catalytic reduction catalyst.

3. The engine system of claim 1, wherein the aftertreatment component comprises a catalytic converter.

4. The engine system of claim 1, further comprising a three-way catalytic converter.

5. The engine system of claim 1, wherein the first exhaust outlet and the second exhaust outlet are fluidly coupled to the intake manifold when the fluid control valve is in the open position and the closed position.

6. The engine system of claim 1, wherein the fluid control valve is structured to selectively fluidly couple the first exhaust outlet and the second exhaust outlet to the exhaust conduit.

7. The engine system of claim 6, wherein the fluid control valve comprises a bypass valve, wherein in an open position a portion of the exhaust gases from the first set of cylinders flow through the fluid control valve.

8. The engine system of claim 6, wherein the fluid control valve comprises a two-position valve, wherein in an open position a portion of the exhaust gases from the second set of cylinders flow through the fluid control valve.

9. The engine system of claim 6, wherein the aftertreatment component comprises a lean NOx trap, and wherein the first set of cylinders are structured to operate in a rich air-fuel mode and wherein the second set of cylinders are structured to operate in a lean air-fuel mode.

10. The engine system of claim 9, wherein the fluid control valve comprises a selectively positioned valve between: a closed position wherein none of the exhaust gases from the first set of cylinders and none of the exhaust gases from the second set of cylinders flow through the fluid control valve to the exhaust conduit, and an open position wherein a portion of the exhaust gases from the first set of cylinders and a portion of the exhaust gases from the second set of cylinders flow through the fluid control valve to the exhaust conduit.

* * * * *